United States Patent [19]
Hotta

[11] Patent Number: 5,179,238
[45] Date of Patent: Jan. 12, 1993

[54] APPARATUS FOR SETTING MUSICAL TONE CONTROL PARAMETER

[75] Inventor: Harumichi Hotta, Hamamatsu, Japan

[73] Assignee: Yamaha Corporation, Hamamatsu, Japan

[21] Appl. No.: 670,235

[22] Filed: Mar. 15, 1991

[30] Foreign Application Priority Data

Mar. 16, 1990 [JP] Japan .................................. 2-67653
Mar. 16, 1990 [JP] Japan .................................. 2-67654

[51] Int. Cl.⁵ ............................................. G09B 15/08
[52] U.S. Cl. ...................................................... 84/478
[58] Field of Search .................. 84/470 R, 477 R, 478, 84/479 R, 479 A, 480, 481, 482, 622

[56] References Cited

U.S. PATENT DOCUMENTS 4,791,847 12/1988 Nishimoto ........................ 84/478 X Primary Examiner—Michael L. Gellner
Assistant Examiner—Howard B. Blankenship
Attorney, Agent, or Firm—Spensley Horn Jubas & Lubitz

[57] ABSTRACT

An apparatus adapted for use in combination with an electronic musical instrument for setting a musical tone control parameter for control of a musical tone to be generated. The setting apparatus includes a display device arranged to selectively provide a plurality of screens thereon and to indicate a plurality of musical tone control parameters on each of the screens, a plurality of parameter setting keys arranged adjacent the display device and positioned to correspond with each position of the control parameters indicated on the respective screens, and an operation key arranged to be operated for selecting one of the screens, wherein the screen of the display device is switched over in response to operation of the operation key, and the musical tone control parameters are set in response to each operation of the parameter setting keys for controlling a musical tone to be generated by performance of the musical instrument.

4 Claims, 16 Drawing Sheets

APPARATUS FOR SETTING MUSICAL TONE CONTROL PARAMETER

BACKGROUND OF THE INVENTION

1. Field of the Invention

The present invention relates to a setting apparatus for setting a musical tone control parameter for control of a musical tone to be generated.

2. Description of the Prior Art

In a conventional apparatus of this kind for setting a musical tone control parameter, a plurality of musical tone control parameters are selectively indicated on a display, and the indicated parameter value is changed by operation of a ten-key, an up-and-down key or the like to be set for generation of a desired musical tone. Alternatively, a plurality of musical tone control parameters are simultaneously indicated on a display to be selectively designated by a cursor positioned thereon, and the designated parameter value is changed by operation of a ten-key or an up-and-down key or the like. Such switchover operation of the parameter indication or positioning of the cursor is troublesome for the player and takes time in setting operation of a plurality of musical tone control parameters.

SUMMARY OF THE INVENTION

It is, therefore, a primary object of the present invention to provide a setting apparatus capable of setting a plurality of desired musical tone control parameters in a simple manner.

According to the present invention, the primary object is attained by providing an apparatus adapted for use in combination with an electronic musical instrument for setting a musical tone parameter, which apparatus comprises display means for selectively providing a plurality of screens thereon and for indicating a plurality of musical tone control parameters on each of the screens, a plurality of parameter setting keys arranged adjacent the display means and positioned to correspond with each position of the musical tone control parameters indicated on the respective screens, an operation key arranged to be operated for selecting one of the screens, means for switching over the screen on the display means in response to operation of the operation key, and means for setting the musical tone control parameters in response to each operation of the parameter setting keys for controlling a musical tone to be generated by performance of the musical instrument.

In an aspect of the present invention, the display means is arranged to indicate the plurality of musical tone control parameters respectively on a plurality of columns on the respective screens, a plurality of second display means are associated with the first-named display means to selectively designate one of the columns on the respective screens when activated so that the musical tone control parameters on the designated column are set in response to each operation of the parameter setting keys, and a plurality of shift keys are arranged to be operated for selectively activating the second display means.

In another aspect of the present invention, there is provided an apparatus adapted for use in combination with an electronic musical instrument, which apparatus comprises first display means for indicating a plurality of musical tone control parameters respectively on a plurality of columns on a screen provided thereon, a plurality of second display means associated with the first display means to selectively designate one of the columns when activated, a plurality of parameter setting keys arranged adjacent the first display means and positioned to correspond with each position of the musical tone control parameters indicated on the screen, a plurality of shift keys arranged to be operated for selectively activating the second display means, and means for setting the musical tone control parameters designated by one of the second display means in response to each operation of the parameter setting keys for controlling a musical tone to be generated by performance of the musical instrument.

BRIEF DESCRIPTION OF THE DRAWINGS

Other objects, features and advantages of the present invention will be more readily appreciated from the following detailed description of a preferred embodiment thereof when considered with reference to the accompanying drawings, in which.

DESCRIPTION OF THE PREFERRED EMBODIMENT

Figure 1:
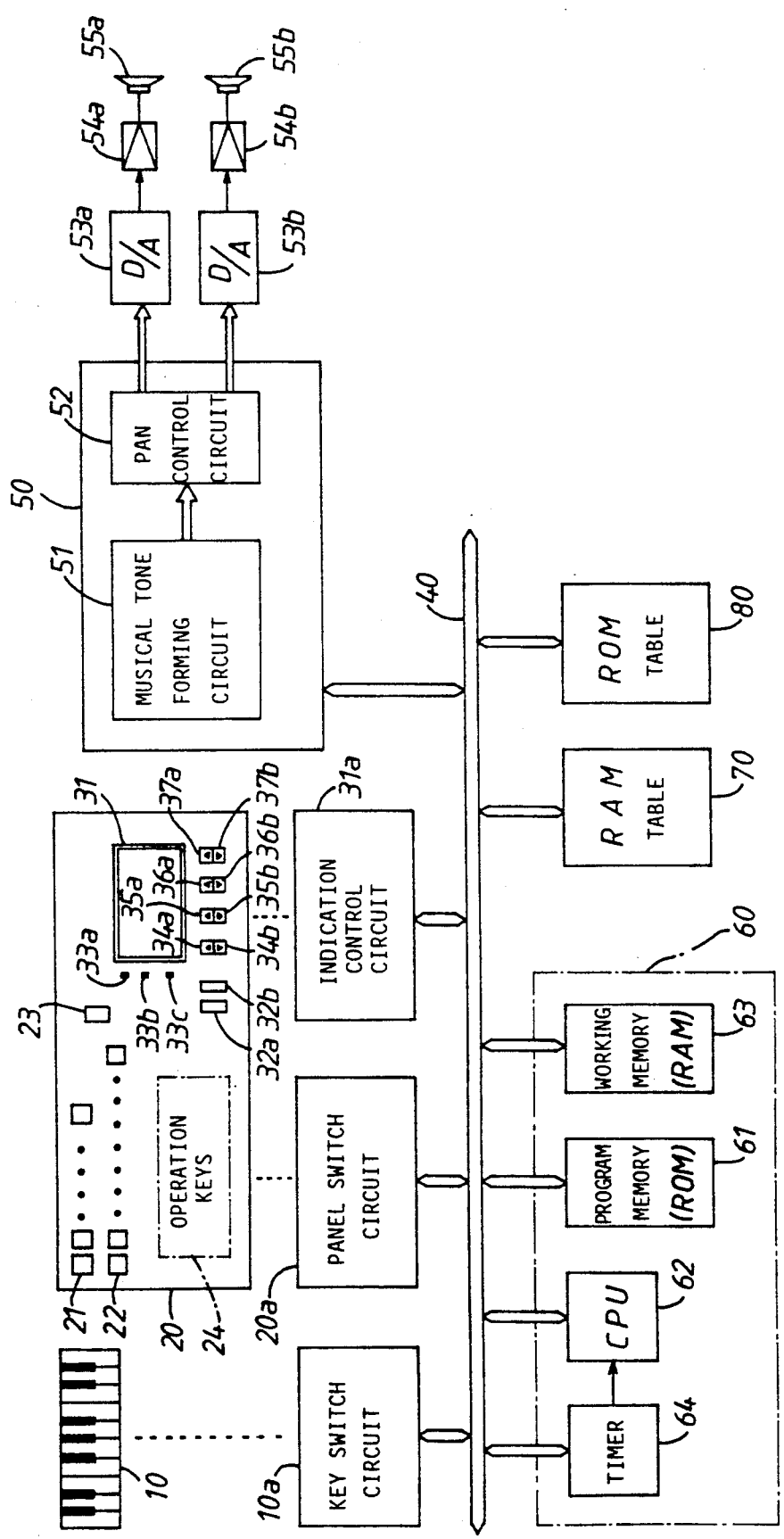
FIG. 1 is a block diagram of an electronic musical instrument provided with a musical tone control parameter setting apparatus in accordance with the present invention.

In FIG. 1 of the drawings, there is diagrammatically illustrated an electronic musical instrument provided with a setting apparatus for setting a musical tone control parameter. The musical instrument has a key board 10 and an operation panel 20. The key board 10 is provided thereon with a plurality of keys the operation of which is detected by opening and closing of a plurality of corresponding key switches in a key switch circuit 10a connected thereto. The operation panel 20 is provided thereon with a group of tone-color selection keys 21, a group of menu-selection keys 22, a parameter setting mode key 23 and other operation keys 24. The group of tone-color selection keys 21 each are allotted with a desired tone-color which is selectively set by operation thereof. The menu selection keys 22 each are allotted with a plurality of predetermined menu tone-colors which are used for designation of the tone-colors at the tone-color selection keys 21. The parameter setting mode key 23 is operated by the player to change the kind of plural musical tone control parameters to be set for one tone-color and to switch over an indication screen on a display 31. The other operation keys 24 are adapted for setting other musical tone control parameters. A panel switch circuit 20a is provided therein with a plurality of operation key switches to be opened and closed by each operation of the operation keys 21–24.

· The display 31 is provided as a main portion for indication on the operation panel 20. Arranged adjacent the display 31 are shift keys 32a, 32b, light emitting elements 33a–33c and first through fourth parameter setting keys 34a,34b–37a,37b. The display 31 is activated under control of an indication control circuit 31a to indicate a set condition of the musical tone control parameters, a tone-color name and various kinds of control parameters necessary for setting the musical tone control parameters. The shift keys 32a, 32b are operated to change the kind of musical tone-color control parameters to be set for one tone-color and to designate the kind of control parameters respectively on upper, middle and lower columns on a screen of the display 31. The light emitting elements 33a–33c are arranged at one side of the display 31 to be activated under control of the indication control circuit 31a for indicating the kind of control parameters designated by operation of the shift keys 32a, 32b. The first through fourth parameter setting keys 34a, 34b–37a, 37b are used to set the respective musical tone control parameters in relation to an indication screen on the display 31. Each operation of the parameter setting keys 34a, 34b–37a, 37b is detected by opening and closing of the operation key switches in the panel switch circuit 20a.

The switch circuits 10a, 20a and indication control circuit 31a are connected to a bus line 40 which is connected to a musical tone signal generating apparatus 50, a microcomputer portion 60, a RAM table 70 and a ROM table 80. The musical tone signal generating apparatus 50 includes therein a musical tone signal forming circuit 51 and a panning control circuit 52. The musical tone signal forming circuit 51 has a plurality of time-divided musical tone signal forming channels which are arranged to produce form digital musical tone signals in accordance with musical tone control signals applied from the bus line 40 and to apply the digital musical tone signals to the panning control circuit 52 at a divided time. The panning control circuit 52 are adapted to distribute a musical tone to speakers 55a, 55b and to control each sound volume of the musical tone generated from the speakers 55a, 55b. The panning control circuit 52 controls each level of the digital musical tone signals from musical tone signal forming circuit 51 in accordance with the musical tone control signals applied from the bus line 40 and applies it to D/A converters 53a, 53b. The D/A converters 53a, 53b convert the digital musical tone signals into analogue musical tone signals and apply them to speakers 55a, 55b through amplifiers 54a, 54b. The speakers 55a, 55b are spaced left and right in a distance for sounding a musical tone in response to the musical tone signals applied thereto.

The microcomputer portion 60 includes a program memory 61, a central processing unit or CPU 62, a working memory 63 and a timer circuit 64 connected in common to the bus line 40. The program memory 61 is in the form of a read-only memory or ROM which is arranged to memorize a main programs and subprograms represented by flow charts shown in FIGS. 4 and 6-19 and a timer interruption program represented by a flow chart shown in FIG. 5. The CUP 62 is arranged to repeatedly execute the main program and subprogram until a power source switch (not shown) is opened after it has been closed and to execute the timer interruption program at each time when applied with an interruption signal from the timer circuit 64. The working memory 63 is in the form of a random access memory or RAM which is arranged to temporarily memorize necessary data for execution of the programs. In addition, the working memory 63 has a sound buffer region for memorizing a musical tone control parameter for one musical tone to be applied to the musical tone signal generating apparatus 50 for producing a musical tone. The timer circuit 64 is adapted to apply the interruption signal to the CPU 62 at each lapse of a predetermined time.

Figure 2:
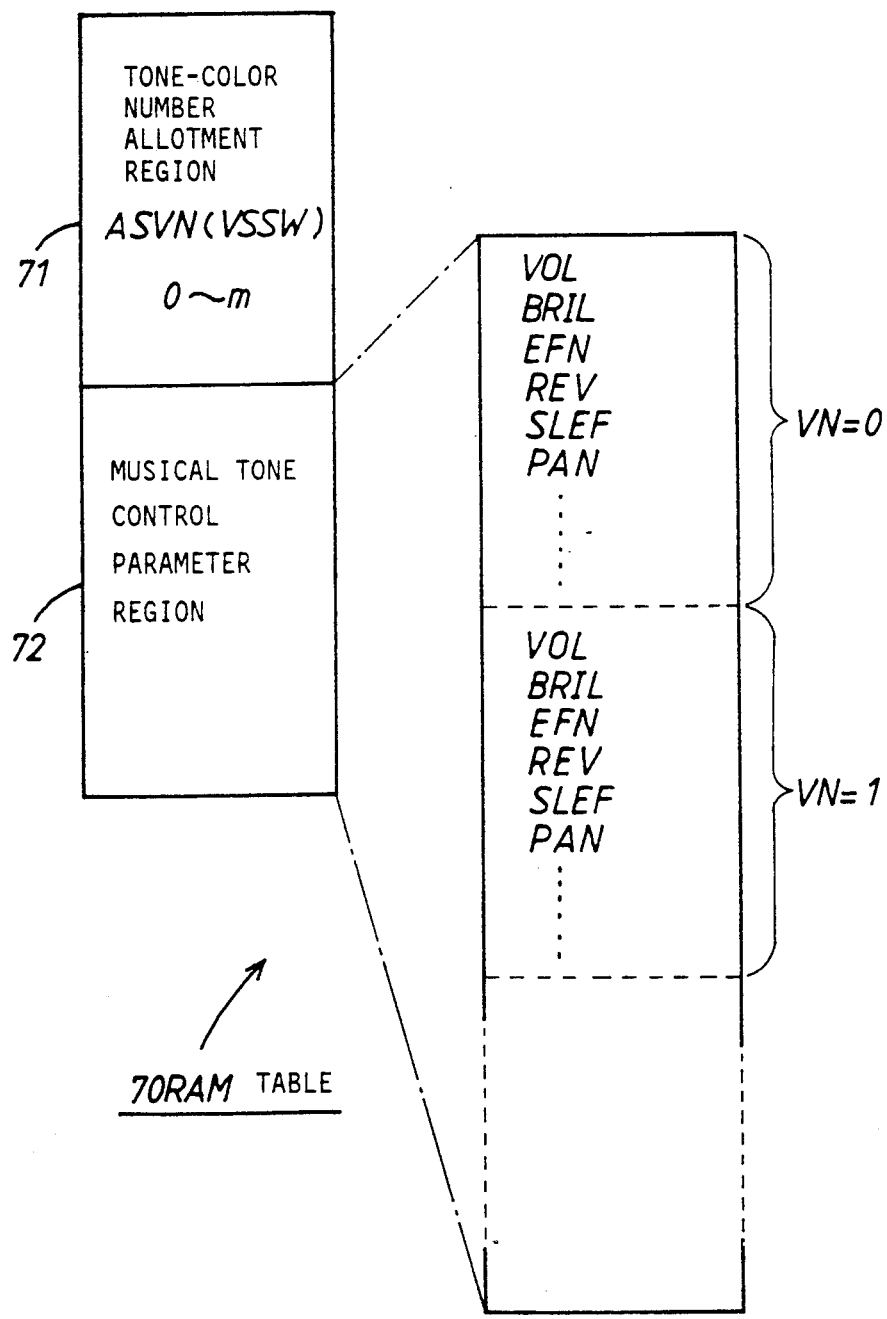
FIG. 2 is an illustration of a data format of a RAM table shown in FIG. 1.
Figure 3:
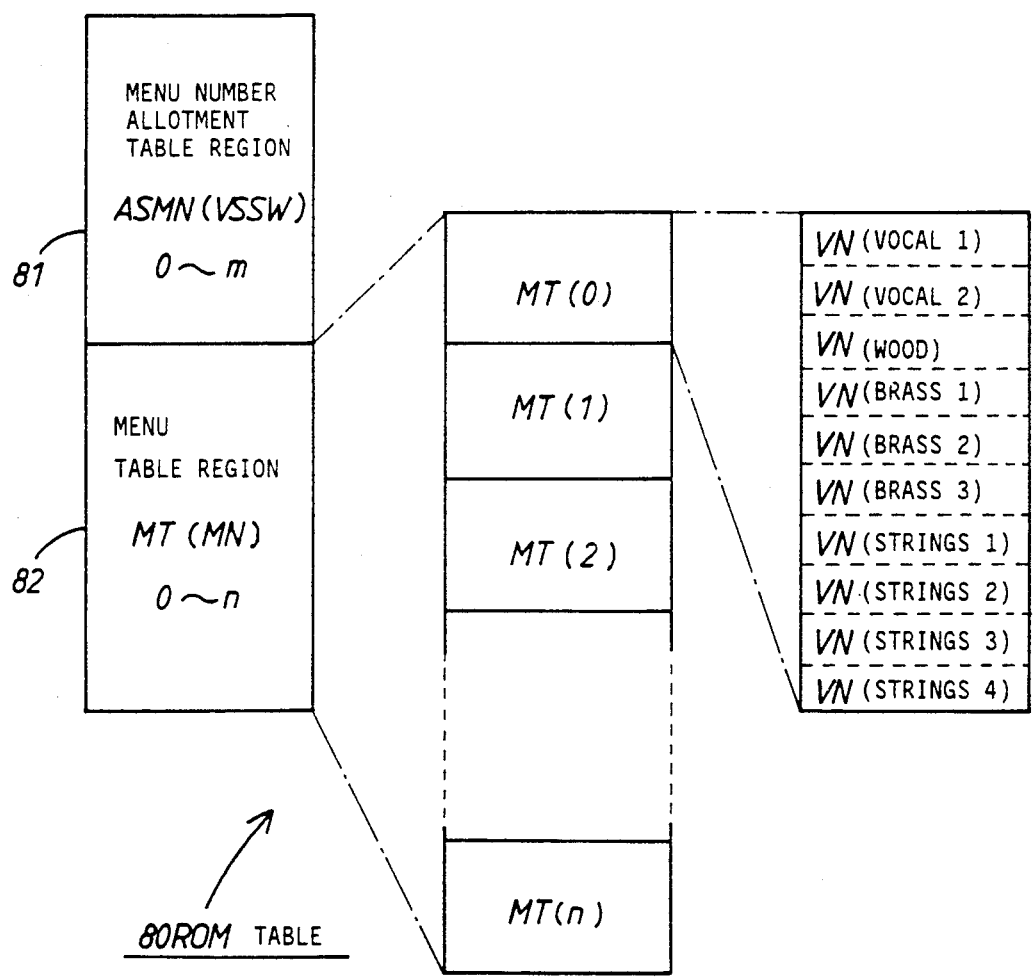
FIG. 3 is an illustration of a data format of a ROM table shown in FIG. 1.
Figure 4:
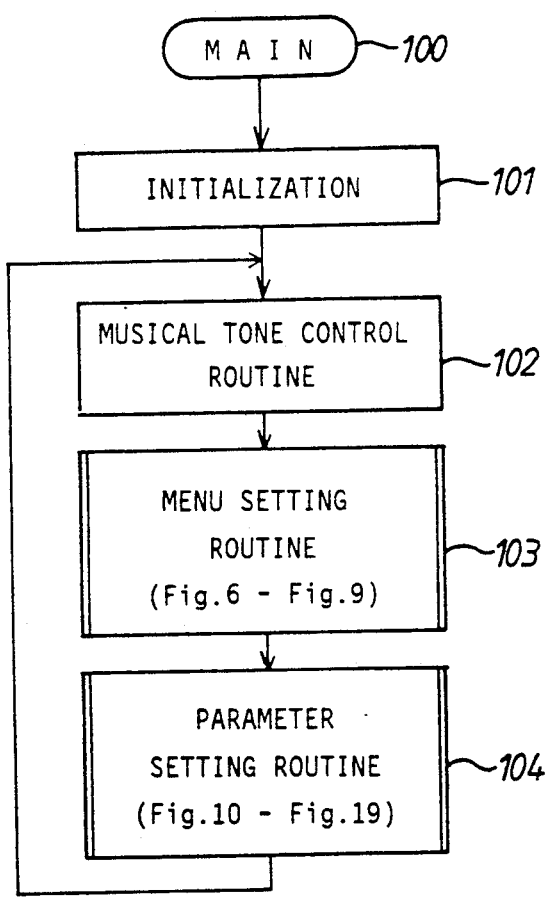
FIGS. 4 to 19 illustrate flow charts of programs executed by a microcomputer shown in FIG. 1.

The RAM table 70 is in the form of a random access memory or RAM which is divided into a tone-color number allotment table region 71 and a musical tone control parameter region 72, as shown in FIG. 2. The tone-color number allotment table region 71 has a memory capacity capable of memorizing tone-color number allotment data ASVN(VSSW) of m+1 and addresses to be designated by a tone-color switch data VSSW indicative of the respective tone-color selection keys 21. The musical tone control parameter region 72 is further subdivided into a plurality of sections 72a, 72b . . . 72n which are designated by the tone-color number data VN to memorize musical tone control parameters such as a tone volume data VOL for each tone color, a slur effect data SLEF, a panning data PAN and the like. The ROM table 80 is in the form of a read-only memory or ROM which is divided into a menu number allotment table region 81 and a menu table region 82 as shown in FIG. 3. The menu number allotment table region 81 is arranged to memorize menu number allotment data ASMN(VSSW) of m+1 and is provided with addresses to be designated by a tone-color switch data VSSW indicative of the respective tone-color selection keys 21. The menu table region 82 is further subdivided into a plurality of sections which are arranged to be designated by menu number data MT(1) . . . Mt(n) corresponding with the menu selection keys 22 for memorizing tone color number data VN indicative of ten tone-colors.

Hereinafter, the mode of operation of the musical instrument will be described with reference to the flow charts shown in FIGS. 4 through 19. When the power source switch is closed, the CPU 62 is activated to initiate execution of the main program at step 100 in FIG. 4 and initializes the working memory 63 and RAM table 70 at step 101. In this instance, the sound buffer in working memory 63 and data in respective regions 71, 72 of RAM table 70 are set as data related to a standard tone-color. After initialization at step 101, processing at step 102-104 will be repeatedly executed by the CPU 62. During execution of the processing at step 102-104, the CPU 62 executes the timer interruption program shown in FIG. 5 at each time when applied with an interruption signal from the timer circuit 64. In a musical tone generation control routine of step 102, a depressed key on the key board 10 is detected by the key switch circuit 10a. The detected key is allotted to either one of the channels in the musical tone signal forming circuit 51, and a pitch data of the detected key, an allotted channel data indicative of the allotted musical tone signal forming channel and a musical tone control parameter memorized in the sound buffer of working memory 63 are applied as musical tone control signals to the musical tone signal generating circuit 50.

In the musical tone signal generating circuit 50, the musical tone signal forming circuit 51 is arranged to produce digital musical tone signals based on the musical tone control signals at the channel designated by the allotted channel data. When applied with the digital musical tone signals, the panning control circuit 52 is controlled by panning data PAN applied thereto as the musical tone control signals to apply the digital musical tone signals to the D/A converters 53a, 53b. Analogue musical tone signals converted from the digital musical tone signals at the D/A converters 53a, 53b are applied to the speakers 55a, 55b thorugh the amplifiers 54a, 54b to be sounded as a musical tone. Thus, the musical tone is sounded in accordance with the musical tone control parameter memorized in the sound buffer of working memory 63, and the pitch of the musical tone corresponds with a pitch designated by the depressed key on the key board 10.

Figure 6A:
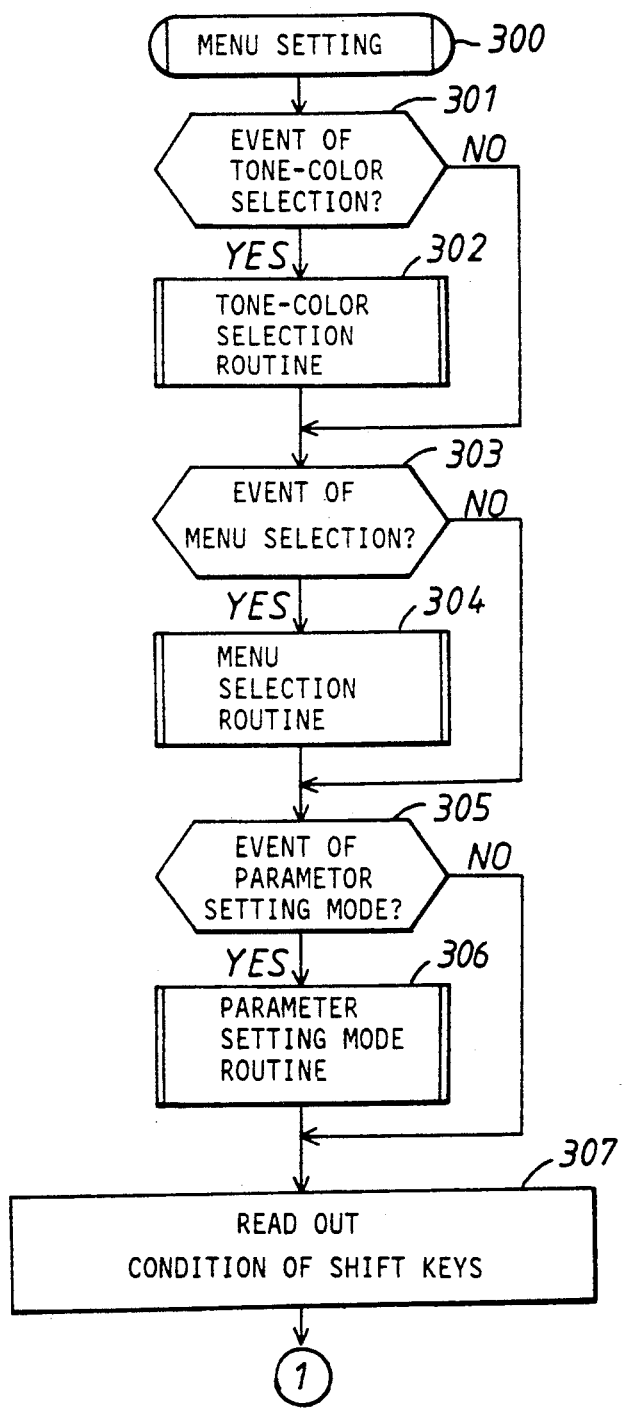
Figure 6B:
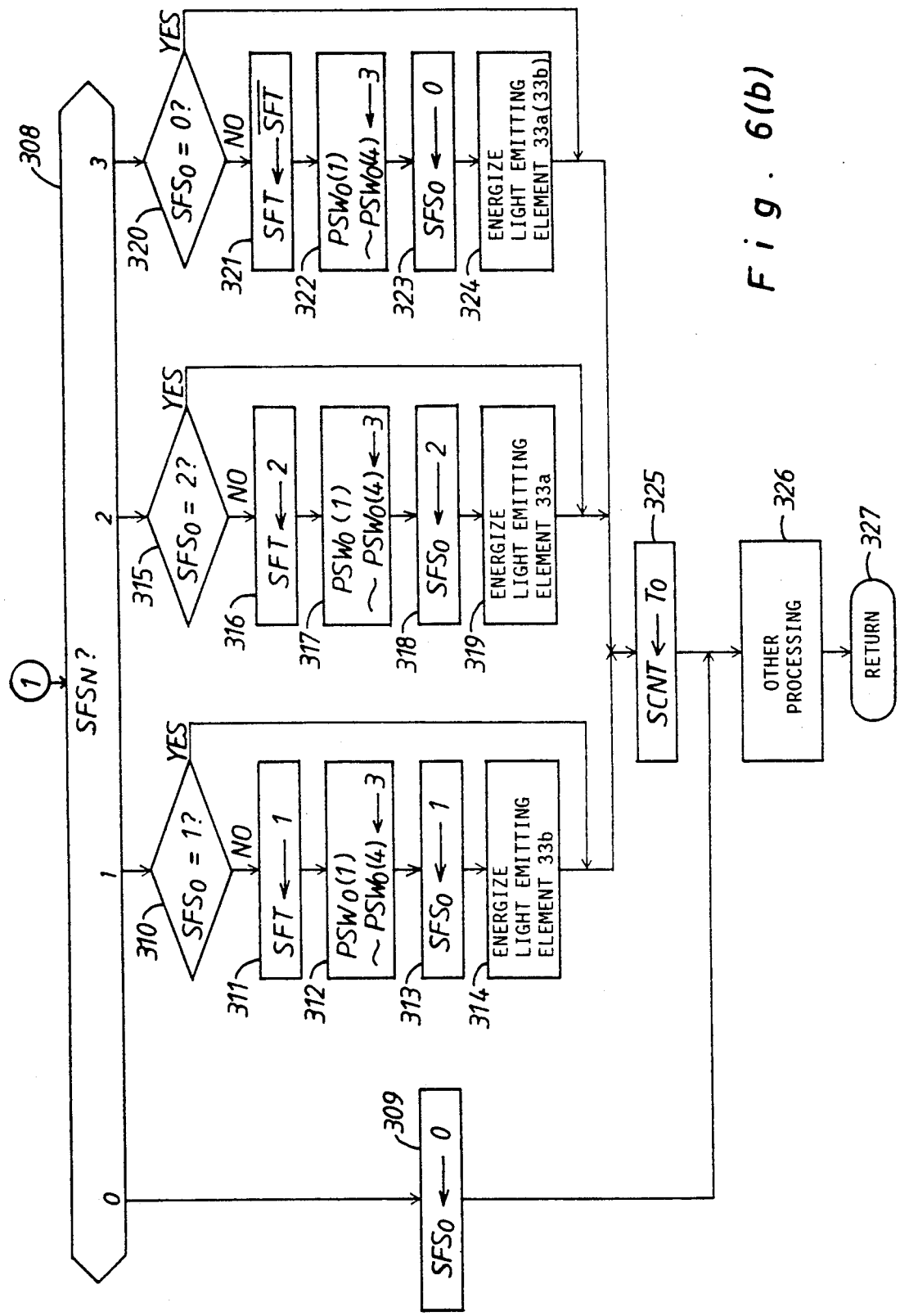

After processing at step 102, the CPU 62 executes a menu setting routine at step 103 and a parameter setting routine at step 104 for setting a musical tone control parameter related to the sounded musical tone. As shown in FIG. 6(a), the CPU 62 initiates execution of the menu setting routine at step 300 to carry out processing at step 301 through 327 in accordance with each operation of the tone-color selection keys 21, menu selection keys 22, parameter setting mode key 23, other operation keys 24 and shift keys 32a, 32b as will be described in detail later. When either one of tone color selection keys 21 is operated, the CPU 62 determines a "Yes" answer at step 301 and causes the program to proceed to step 302 for execution of a tone-color selection routine shown in FIG. 7. When the tone-color selection keys 21 have not been operated, the CPU 62 determines a "No" answer at step 301 and causes the program to proceed to step 303.

Figure 7:
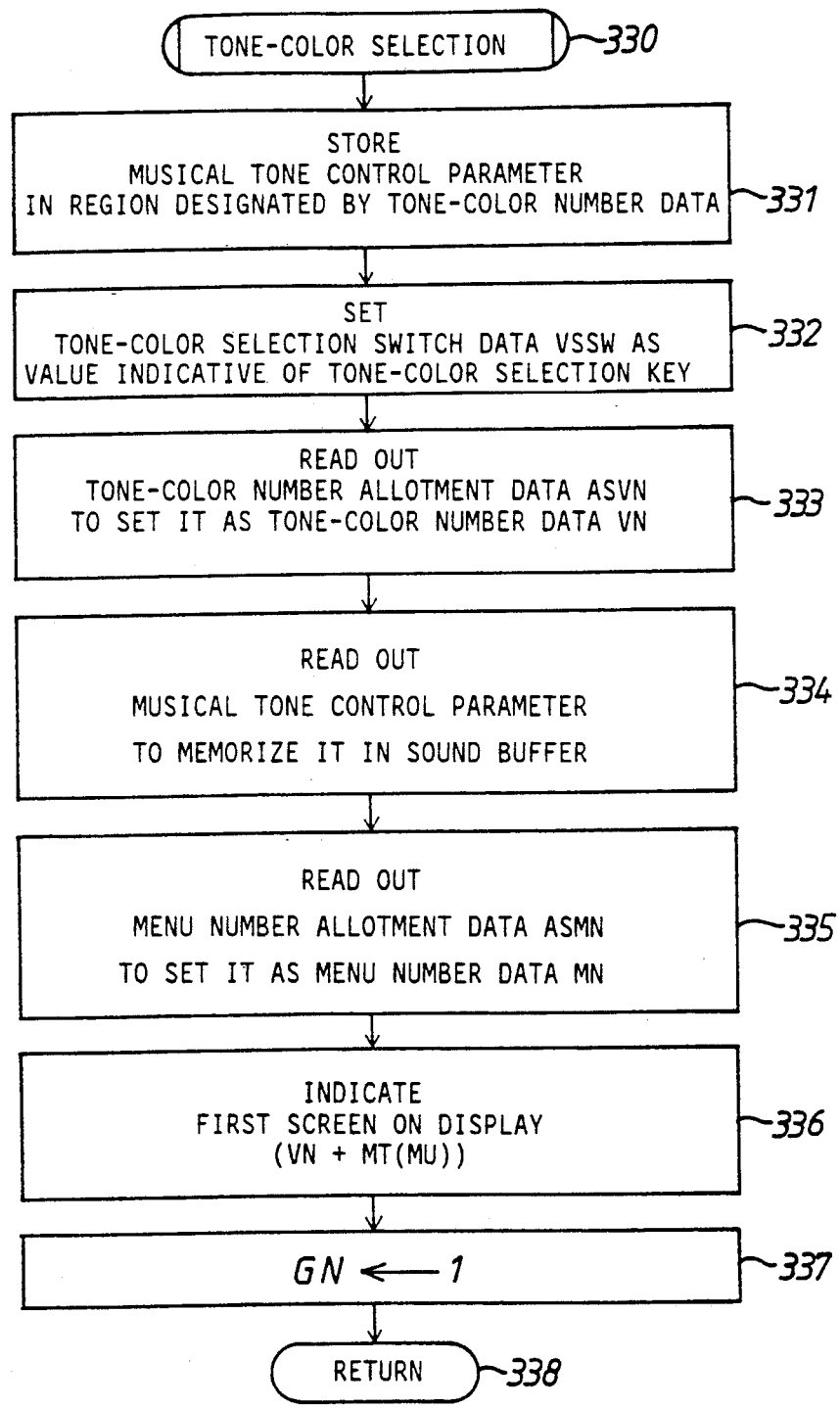

Assuming that execution of the tone-color selection routine has been initiated at step 330 in FIG. 7, the CPU 62 reads out at step 331 a memorized musical tone control parameter from the sound buffer of working memory 63 and stores it in a region designated by the tone-color number data VN in the musical tone control parameter region 72 shown in FIG. 2. This means that a musical tone control parameter memorized in the sound buffer of working memory 63 is returned into the musical tone control parameter region 72 in accordance with the present tone-color number VN. As a result, the previous musical tone control parameter in the sound buffer reappears even if the tone-color number data VN is changed by operation of the tone-color selection keys 21 to change the musical tone control parameter in the sound baffer. When the program proceeds to step 332, the CPU 62 sets the tone-color selection switch data VSSW as a value indicative of the operated tone-color selection key 21 and reads out at step 333 a tone-color number allotment data ASVN memorized in the tone-color number allotment table region 71 and designated by a tone-color selection switch data VSSW after initially set and changed thereafter. After the tone-color number allotment data ASVN has been set as a tone-color number data VN, the CPU 62 reads out at step 334 all the musical tone control parameters memorized in the musical tone control parameter region 72 at a position designated by the tone color-number data VN. The musical tone control parameters are transferred to and memorized in the sound buffer of working memory 63.

Figure 20:
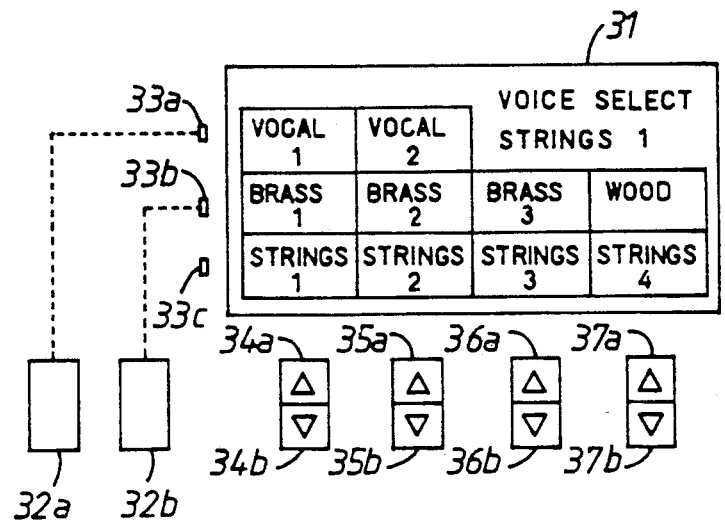
FIGS. 20 and 21 illustrate each indication on a display shown in FIG. 1.

After processing at step 334, the CPU 62 reads out at step 335 the menu number allotment data ASMN(VSSW) designated by the tone-color switch data VSSW from the menu number allotment table region 81 to set it as a menu number data MN and controls at step 336 an indication on the display 31 on a basis of the tone-color number data VN and menu number data MN. In such control of the indication on display 31, the indication control circuit 31a is applied with the tone-color number data VN and menu table data NT(MN) (for instance, ten tone-color number data VN) designated by the menu number data MN and read out from the menu table region 82. Thus, the indication control circuit 31 controls the display 31 in accordance with the data applied thereto in such manner that a tone-color name defined by the tone-color number data VN is indicated on a right upper portion of display 31 and that each name of ten tone-colors defined by the menu table data MT(MN) is indicated on three columns on display 31 in a vertical direction as shown in FIG. 20. After control of the indication on display 31, the CPU 62 sets at step 337 a screen number data GN indicative of the indicated screen on display 31 as "1" and finishes at step 338 the processing of the tone-color selection routine.

Figure 8:
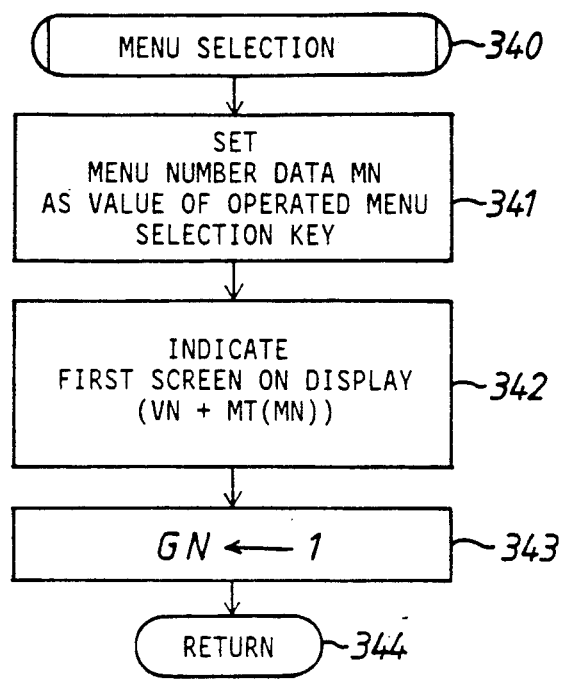

When the program proceeds to step 303 shown in FIG. 6(a), the CPU 62 determines a "Yes" answer if either one of menu selection keys 22 is operated and causes the program to proceed to step 304 for execution of a menu selection routine shown in FIG. 8. If the answer is "No" at step 303, the CPU 62 causes to proceed to step 305. Assuming that execution of the menu selection routine has been initiated at step 340 shown in FIG. 8, the menu number data MN is set at step 341 as a value indicative of an operated menu selection key 22, and the same processing as that at step 336 and 337 is executed at step 342 and 343. At the following step 344, the execution of the menu selection routine is finished. Thus, the tone-color names on the three columns of display 31 are changed by operation of the menu selection keys 22. Referring back to the flow chart shown in FIG. 6(a), the CPU 62 determines a "Yes" answer at step 305 if the parameter setting mode key 23 is operated and causes the program to proceed to step 306 for execution of a parameter setting mode routine shown in FIG. 9. If the answer is "No" at step 305, the CPU 62 causes the program to proceed to step 307.

Figure 9:
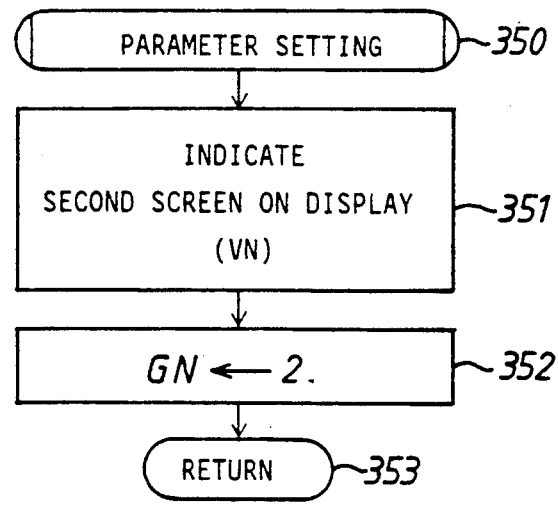

Assuming that execution of the parameter setting mode routine has been initiated at step 350 shown in FIG. 9, the musical tone control parameter in the sound buffer of working memory 63 is applied to the indication control circuit 31a at step 351. Thus, the indication control circuit 31a controls the display 31 in accordance with the musical tone control parameter data in such a manner that a presence or absence (ON/OFF) of slur effect and a panning control condition are indicated on an upper column of display 31 and that a magnitude of tone volume, a level of brilliance, a kind of sound effect such as a tremolo, a symphony or the like and level of reverberation are indicated on middle and lower columns of display 31 asn shown in FIG. 21. After such control of the indication, the CPU 62 sets the screen number data GN as "2" representing the indication at step 352 and finishes the parameter setting mode routine at step 353.

When the program proceeds to step 307 shown in FIG. 6(a) after the execution at step 305 and 306, the CPU 62 reads out a condition of shift keys 32a, 32b from the operation switch circuit 20a to set it as a new shift switch data $SFS_N$. The new shift switch data $SFS_N$ is composed of two bits in which 1/0 of the higher bit represents on/off operation of the shift key 32a while 1/0 of the lower bit represents on/off operation of the shift key 32b. As will be described later, an old shift switch data $SFS_O$ represents a previous condition of shift keys 32a, 32b but is the same as the new shift switch data $SFS_N$ as to a data format. At the following step 308 shown in FIG. 6(b), the CPU 62 determines as to whether the new shift switch data $SFS_N$ is either "0", "1", "2" or "3". Assuming that the shift keys 32a, 32b are not yet operated, the new shift switch data $SFS_N$ is determined as "0" at step 308, and the program proceeds to step 309 where the old shift switch data $SFS_O$ is renewed as "0".

When only the shift switch 32b is operated, the new shift switch data $SFS_N$ is determined as "1" at step 308, and the program proceeds to step 310 where the CPU 62 determines a "Yes" answer if the old shift switch data $SFS_O$ is "1" and causes the program to proceed to step 325. If the old shift switch data $SFS_O$ is not "1", the CPU 62 determines a "No" answer at step 310 and causes the program to proceed to step 311 where the shift data SFT is set as "1". The shift data SFT is composed of two bits which are adapted to designate a column on display 31 for indicating thereon a parameter set by operation of the first through fourth setting keys 34a, 34b-37a, 37b. When the shift data SFT is set as "0", a lower column on display 31 is designated for indicating the parameter thereon. When the shift data SFT is set as "1", a middle column on display 31 is designated for indicating the parameter thereon. When the shift data SFT is set as "2", an upper column on display 31 is designated for indicating the parameter thereon. Subsequently, first through fourth old parameter setting switch data $PSW_O(1)$-$PSW_O(4)$ are set as "3" respectively at step 312 to be utilized for setting of a parameter described later. At the following step 313, the old shift switch data $SFS_O$ is renewed as "1" to control energization of the light emitting element 33b at step 314.

When only the shift key 32a is operated, the new shift switch data $SFS_N$ is determined as "2" at step 308, and the program proceeds to step 315 where the CPU 62 determines a "Yes" answer if the old shift switch data $SFS_O$ is "2" and causes the program to proceed to step 325. If the old shift switch data $SFS_O$ is not "2", the CPU 62 determines a "No" answer at step 315 and causes the program to proceed to step 316 wherein the shift data SFT is set as "2". At the following step 317, the first through fourth old parameter setting switch data $PSW_O(1)$-$PSW_O(4)$ each are set as "3", and the old shift switch data $SFS_O$ is renewed as "2" at step 318 to control energization of the light emitting element 33a at step 319. When both the shift keys 32a and 32b are simultaneously operated, the new shift switch data $SFS_N$ is determines as "3" at step 308, and the program proceeds to step 320 where the CPU 62 determines a "Yes" answer if the old shift switch data $SFS_O$ is "0" and causes the program to proceed to step 325. If the old shift switch data $SFS_O$ is not "0", the CPU 62 determines a "No" answer at step 320 and causes the program to proceed to step 321 where each bit of the shift data SFT is inverted. In this instance, the data value "01" is changed to "10" while the data value "10" is changed to "01". This means that if one of the shift keys 32a, 32b is operated in a condition where the other shift key has been operated, operation of the former shift key is effected in preference to operation of the latter shift key. At the following step 322, the first through fourth old parameter setting switch data $PSW_O(1)$-$PSW_O(4)$ each are set as "3", and the old shift switch data $SFS_O$ is renewed as "0" at step 323 to avoid repetitive inversion of the shift data SFT at step 321. When the shift data is "1" at step 324, only energization of the light emitting element 33a is controlled. When the shift data is "2" at step 324, only energization of the light emitting element 33b is controlled.

Figure 5:
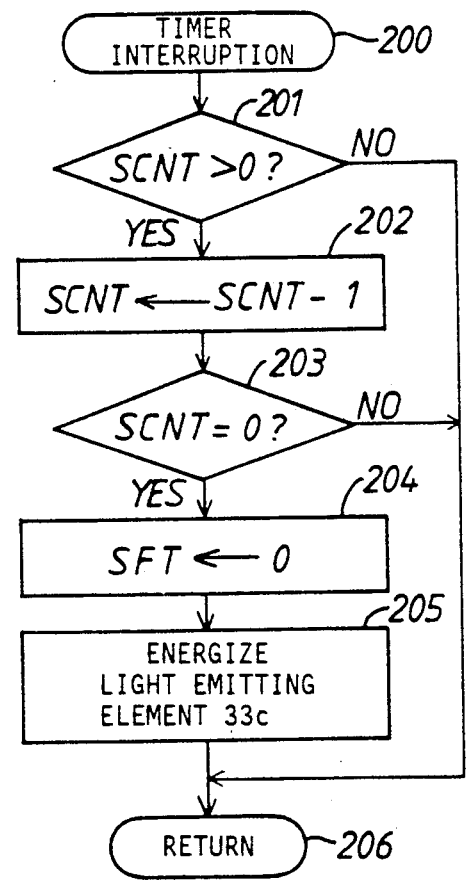

When the program proceeds to step 325 after processing at step 310-324, a shift count data SCNT is set as a predetermined value $T_O$. In this instance, the shift count data SCNT is sequentially counted down to "0" during execution of the timer interruption program to measure a predetermined time after operation of the shift keys 32a, 32b. As shown in FIG. 5, the shift count data SCNT of more than "0" is sequentially subtracted by "1" during execution at step 201-203 to return the shift data SFT to "0" when it has been substracted to "0". Thus, only energization of the light emitting element 33c is controlled at step 205, and the shift data SFT is set as "1" or "2" for the predetermined time to energize either the light emitting element 33a or 33b. After execution at step 309 or 325 shown in FIG. 6(b), the CPU 62 executes processing for the other operation keys 24 at step 326 and returns at step 327 the program to step 104 of the main routine shown in FIG. 4.

When the program returns to step 104, the CPU 62 executes a parameter setting routine shown in FIG. 10 as will be described below. At step 400, the CPU 62 initiates execution of the parameter setting routine to determine as to whether the screen number data GN is "1" or not at step 401. If the answer is "Yes" at step 401, the CPU 62 executes processing at the following step 402, 403 and 411. In this instance, the indication on display 31 is conditioned as shown in FIG. 20. Assuming that in such a condition either one of the parameter setting keys 34a, 34b-37a, 37b is operated, the CPU 62 determines a "Yes" answer at step 402 and causes the program to proceed to step 403 for execution of a tone-color setting routine shown in FIG. 11. If the answer is "No" at step 402, the program proceeds to step 411 for execution of the other processing. When the CPU 62 initiates execution of the tone-color setting routine at step 420 shown in FIG. 11, a variable i is set as a value corresponding with the operated parameter setting key at step 421. In this instance, the variable i is set as "1" if either one of the parameter setting keys 34a, 34b is operated and is set as "2" if either one of the parameter setting keys 35a, 35b is operated. The variable i is further set as "3" if either one of the parameter setting keys 36a, 36b is operated and is set as "4" if either one of the parameter setting keys 37a, 37b is operated.

At the following step 422, the CPU 62 executes calculation of $SFT*4+i-1$ and sets the resultant of the calculation as a menu table pointer MTP. The calculation processing is carried out to coincide a tone-color name designated by operation of the parameter setting keys 34a, 34b-37a, 37b from the ten tone-color names indicated on display 31 with a tone-color number data designated by the menu table pointer MTP from the ten tone-color number data VN in the section MT(MN) of menu table region 82. For this reason, the CPU 62 determines a "No" answer at step 423 if the value of menu table pointer MTP is more than "10" and causes the program to proceed to step 428. If the value of menu table pointer MTP is less than "10", the CPU 62 determines a "Yes" answer at step 423 and causes the program to proceed to step 424. Thus, the CPU 62 reads out at step 424 a tone color number data designated by the menu table pointer MTP from the ten tone-color number data VN in the section MT(MN) of menu table region 82 to set it as a tone-color number date VN. At the following step 425, the CPU 62 newly sets the tone-color number data VN as a tone-color number allotment data ASVN(VN) designated by the tone-color switch data VSSW in the tone-color number allotment table 71. Thus, the CPU 62 changes at step 426 the tone-color name indicated on the upper right of display 31 to a tone-color name corresponding with the tone-color number data VN and reads out at step 427 all the musical tone control parameters memorized in a section of the musical tone control parameter region 72 designated by the tone-color number data VN to store them in the sound baffer of working memory 63. Thereafter, the CPU 62 finishes processing of the tone color setting routine at step 428.

In such processing at step 421-427 as described above, a tone-color name of the musical tone to be generated is set as a musical tone control parameter in response to operation of the parameter setting keys 34a, 34b-37a, 37b. If the parameter setting keys 34a, 34b-37a, 37b are operated without any operation of the shift keys 32a, 32b or after lapse of a long time from operation of the shift keys 32a, 32b, either one of four tone-colors on the lower column of display 31 will be set for indication. If either one of the parameter setting keys 34a, 34b-37a, 37b is operated immediately after operation of the shift keys 32b, either one of four tone-colors on the middle column of display 31 will be set for indicating. If either one of the parameter setting keys 34a, 34b-37a, 37b is operated immediately after operation of the shift key 32a, either one of two tone-colors on the upper column of display 31 will be set for indication.

Figure 10:
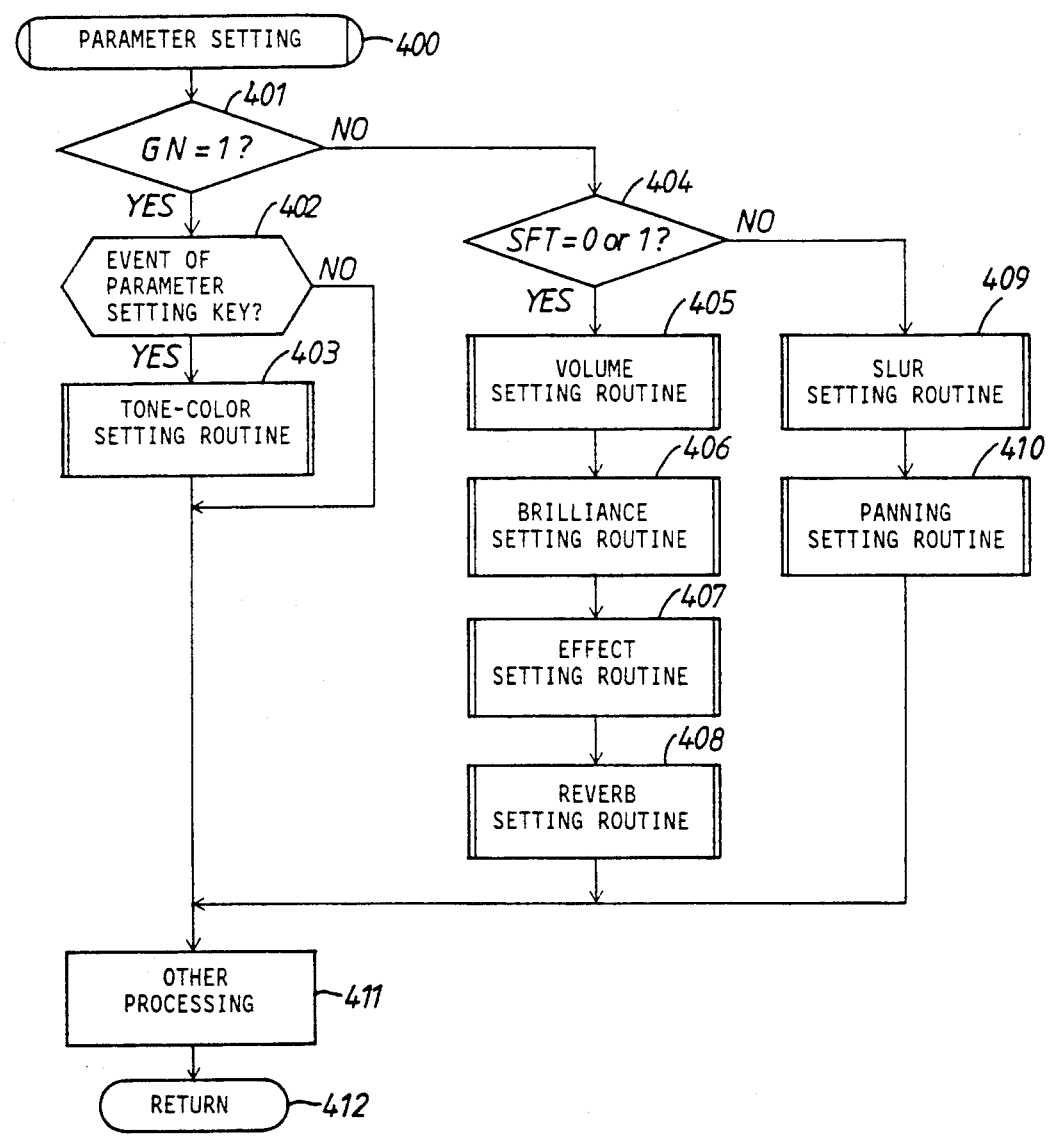
Figure 11:
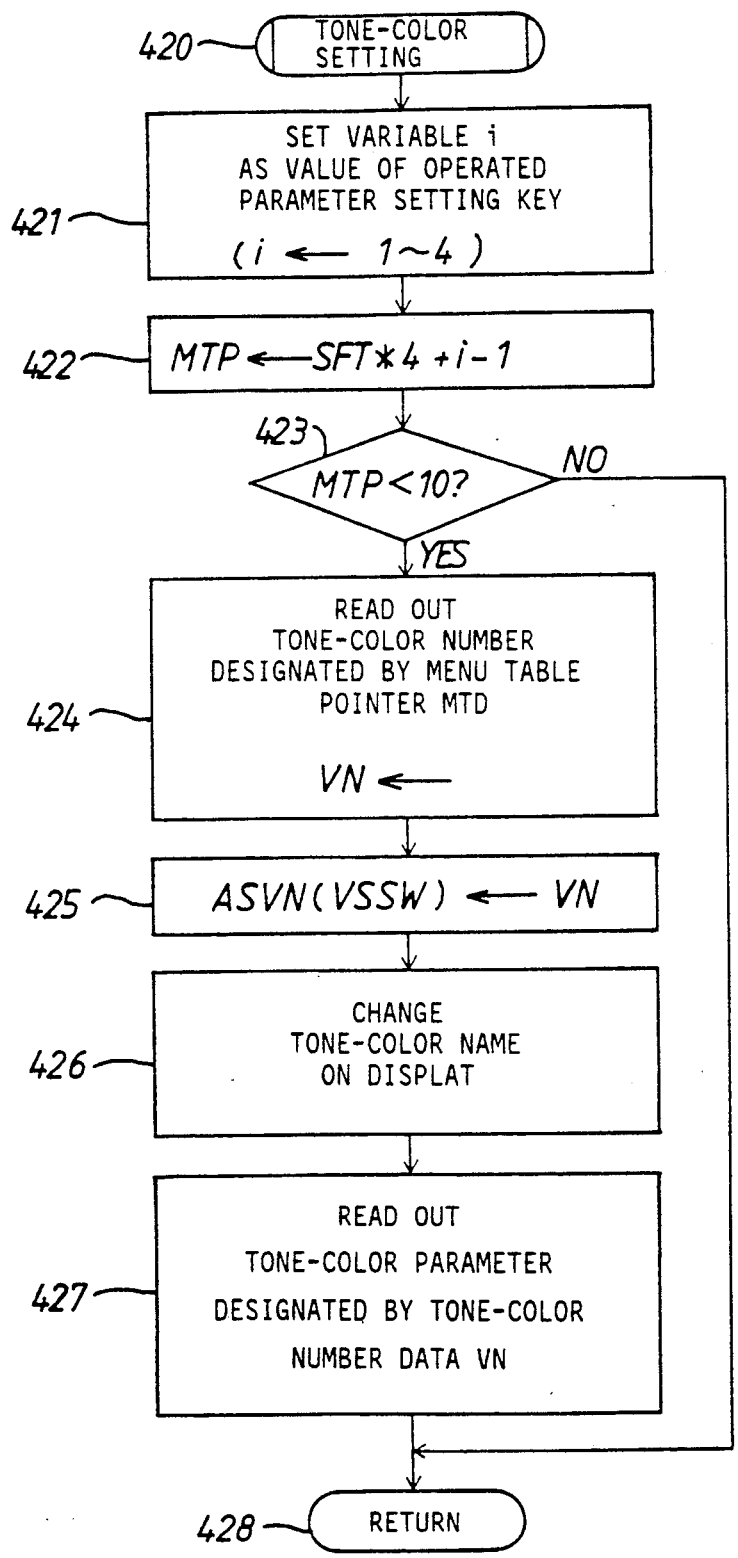
Figure 21:
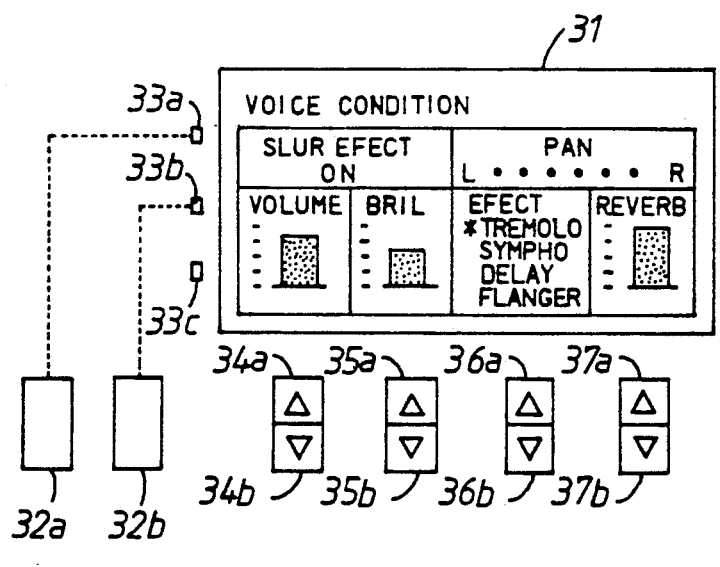

When the screen number data GN is set as "2" in operation of the parameter setting mode key 23, the CPU determines a "No" answer at step 401 shown in FIG. 10 and causes the program to proceed to step 404. In this instance, the indication of display 31 is conditioned as shown in FIG. 21. At step 404, the CPU 62 determines as to whether or not the shift data SFT is "0" or "1". If the answer is "Yes" at step 404, the CPU 62 executes a volume setting routine, a brillance setting routine, an effect setting routine and a reverb setting routine, respectively at step 405, 406, 407 and 408. If the shift data SFT is "2", the CPU 62 determines a "No" answer at step 404 and causes the program to proceed to step 409. In this instance, the CPU 62 executes a slur setting routine and a panning setting routine, respectively at step 409 and 410. After processing at step 403, 408 or 410, the CPU 62 executes processing for the other operation keys 24 at step 411 and finishes the execution of the parameter setting routine.

Figure 12:
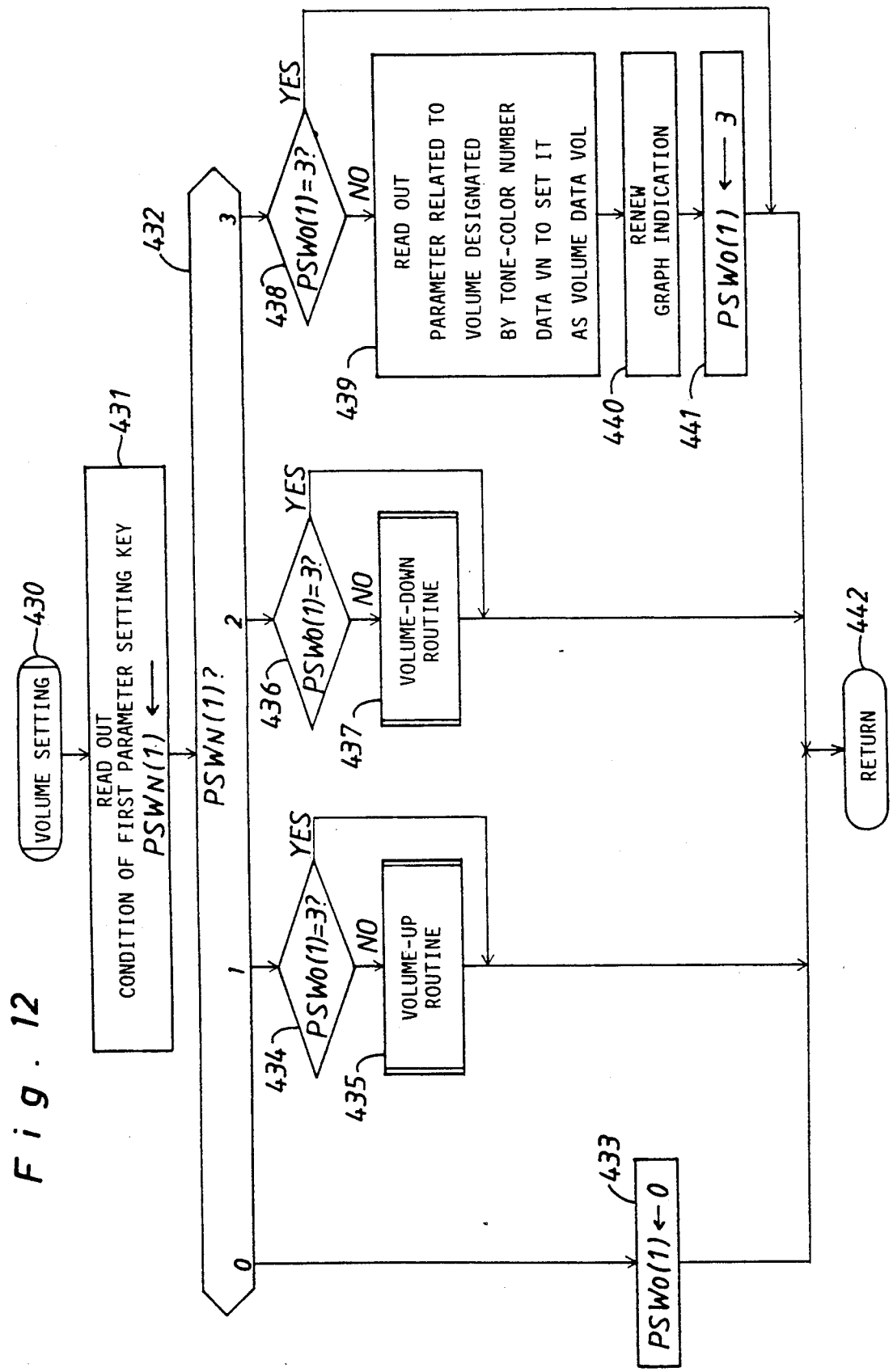
Figure 13:
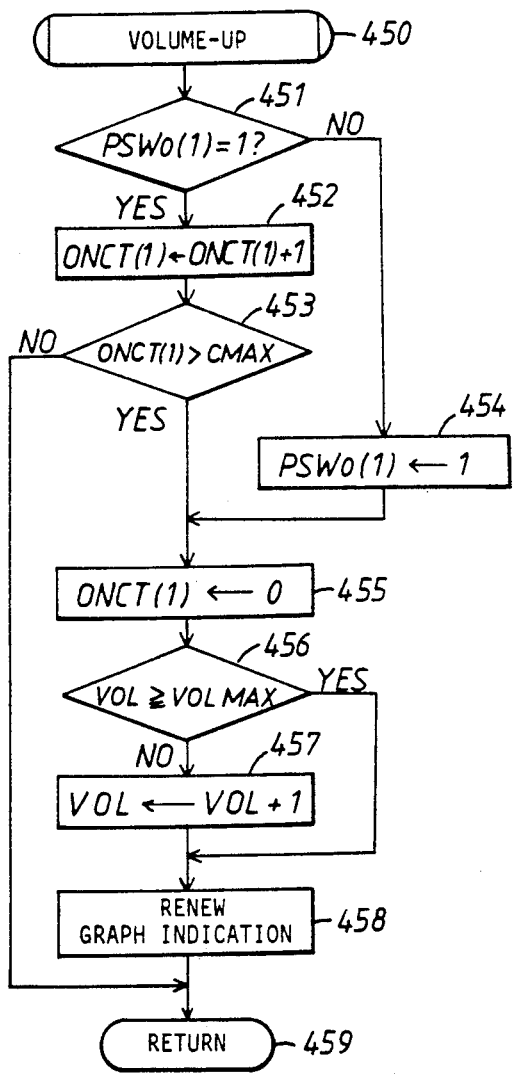
Figure 14:
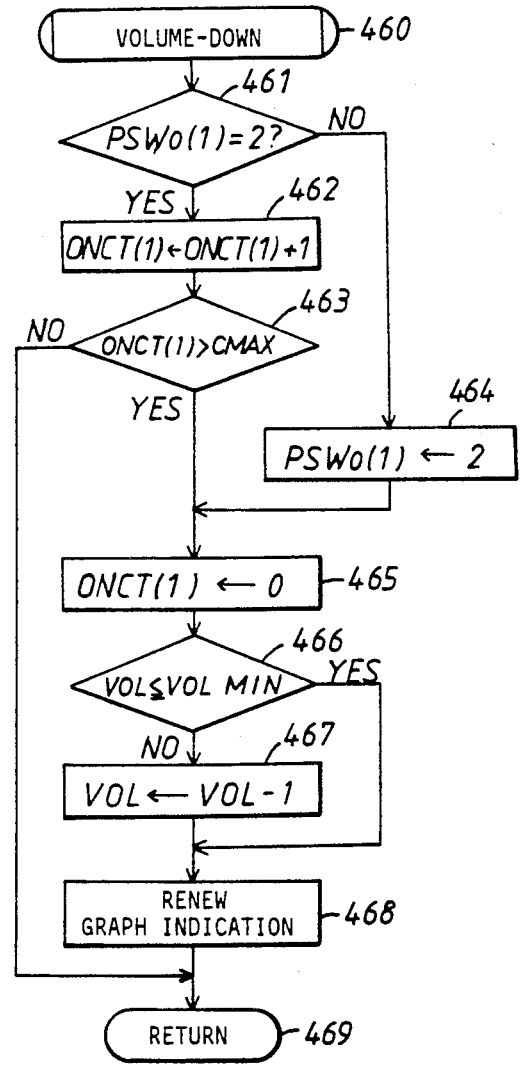

As shown in FIG. 12, the CPU 62 initiates execution of the volume setting routine at step 430 and reads out a condition of the first parameter setting keys 34a, 34b from the operation switch circuit 20a at step 431 to set it as a new parameter setting switch data $PSW_N(1)$. The new parameter setting switch data $PSW_N(1)$ is composed of two bits in which 1/0 of the lower bit represents on/off operation of the first parameter setting key 34a while 1/0 of the higher bit represents on/off operation of the first parameter setting key 34b. In addition, the previous condition of first parameter setting keys 34a, 34b is represented by an old parameter setting switch data $PSW_O(1)$ described later. As to the data format, the old parameter setting switch data $PSW_O(1)$ is represented as the same data as the new parameter setting switch data $PSW_N(1)$. At the following step 432, the CPU 62 determines as to whether the new parameter setting data $PSW_N(1)$ is "0", "1", "2" or "3". If the first parameter setting keys 34a, 34b are not operated, the new parameter setting data $PSW_N(1)$ is determined as "0" at step 432. Thus, the program proceeds to step 433 where the old parameter setting data $PSW_O(1)$ is renewed as "0". If only the first parameter setting key 34a is operated, the new parameter setting data $PSW_N(1)$ is determined as "1". In this instance, the program proceeds to step 434 where the CPU 62 determines a "Yes" answer if the old parameter setting data $PSW_O(1)$ is "3" and causes the program to proceed to step 442. This means that a volume-up routine may not be processed even if the first parameter setting key 34a is operated in a condition where the shift keys 32a, 32b are operated or if both the first parameter setting keys 34a, 34b are simultaneously operated. In such a condition, the old parameter setting switch data $PSW_O(1)$ is set as "3" by processing at step 312, 317 or 322 and at step 441 of FIG. 12 as will be described later. If in this condition both the first parameter setting keys 34a, 34b are turned off, the old parameter setting switch data $PSW_O(1)$ is renewed as "0" by processing at step 433. If the old parameter setting switch data $PSW_O(1)$ is not "3", the CPU 62 determines a "No" answer at step 434 and causes the program to proceed to step 435 for execution of the volume-up routine shown in FIG. 13.

When the first parameter setting key 34a has been first turned on, the old parameter setting switch data $PSW_O(1)$ is not yet set as "1". Accordingly, the CPU 62 determines a "No" answer at step 451 of the volume-up routine and causes the program to proceed to step 454 where the old parameter setting switch data $PSW_O(1)$ is set as "1". Under processing at step 456 and 457, the volume data VOL in the sound buffer of working memory 63 is increased by "1" while it is maintained less than a maximum value VOL MAX. If the first parameter setting key 34a is continually turned on, the old parameter setting switch data $PSW_O(1)$ will be set as "1". Thus, the CPU 62 determines a "Yes" answer at step 451 and causes the program to proceed to step 452 for processing at step 453 and 455-457. Under processing at step 452, 453 and 455-457, an on-count data ONCT(1) is increased by "1" from "0" up to a maximum value CMAX, and the volume data VOL is increased by "1" up to a maximum value VOL MAX at each time when the on-count data ONCT(1) is increased up to the maximum value CMAX.

When only the parameter setting key 34b is tured on, the new parameter setting switch data $PSW_N(1)$ is determined as "2" at step 432 shown in FIG. 12. In this instance, the program proceeds to step 436 where the CPU 62 determines a "Yes" answer if the old parameter setting switch data $PSW_O(1)$ is "3" and causes the program to proceed to step 442. If the answer at step 436 is "No", the program proceeds to step 437 where the CPU 62 executes a volume-down routine shown by a flow chart in FIG. 14. When the first parameter setting key 34b has been first turned on, the old parameter setting switch data $PSW_O$ is not yet set as "1". Accordingly, the CPU 62 determines a "No" answer at step 461 of the volume-down routine and causes the program to proceed to step 464 where the old parameter setting switch data $PSW_O(1)$ is set as "2". Under processing at step 466 and 467, the volume data VOL is subtracted by "1" while it is maintained larger than a minimum value VOL MIN. If the first parameter setting key 34b is continually turned on, the old parameter setting switch data $PSW_O(1)$ is still set as "2". Thus, the CPU 62 determines a "Yes" answer at step 461 and causes the program to proceed to step 462 for processing at step 463 and 465-467. Under processing at step 462, 463 and 465-467, the on-count data ONCT(1) is increased by "1" from "0" up to the maximum value CMAX, and the volume data VOL is decreased by "1" to the minimum value VOL MIN at each time when the on-count data ONCT(1) is increased up to the maximum value CMAX. As a result, the volume data VOL in the sound buffer of working memory 63 is increased or decreased in accordance with operation of the first parameter setting keys 34a, 34b. When the volume data VOL has been increased or decreased, a graph indication of the volume data VOL on display 31 is changed at step 458 or 468 as shown in FIG. 21.

If both the first parameter setting keys 34a, 34b are simultaneously turned on, the new parameter setting switch data $PSW_N$ is determined as "3" at step 432 shown in FIG. 12. In this instance, the program proceeds to step 438 where the CPU 62 determines a "Yes" answer if the old parameter setting switch data $PSW_O$ is "3" and causes the program to proceed to step 442. If the answer at step 438 is "No", the program proceeds to step 439 where the CPU 62 reads out a parameter representing the volume designated by the tone color number data VN in the musical tone control parameter region 72 to set it as a volume data VOL in the sound buffer of working memory 63. Thus, the CPU 62 acts to change a graph indication on display 31 in accordance with the volume data VOL and sets the old parameter setting switch data $PSW_O(1)$ as "3" at step 441. At the following step 442, the CPU 62 finishes processing of the volume setting routine.

Subsequently, the CPU 62 executes the brilliance and reverb setting routines at step 406 and 408 of FIG. 10 as will be described below. The brilliance and reverb setting routines are processed by the CPU 62 substantially in the same manner as that of the volume setting routine shown in FIGS. 12-14 to renew the brilliance data BRIL and reverb data REV in the sound buffer of working memory 63 in accordance with operation of the second and fourth parameter setting keys 35a, 35b; 37a, 37b and to renew graph indications of the brilliance and reverb on display 31. The CPU 62 further executes the effect setting routine at step 407 of FIG. 10 as will be described below. The effect setting routine is processed by the CPU 62 to selectively provide a tremolo, a symphony, a delay or a plunger effect in accordance with operation of the third parameter setting keys 36a, 36b.

Figure 15:
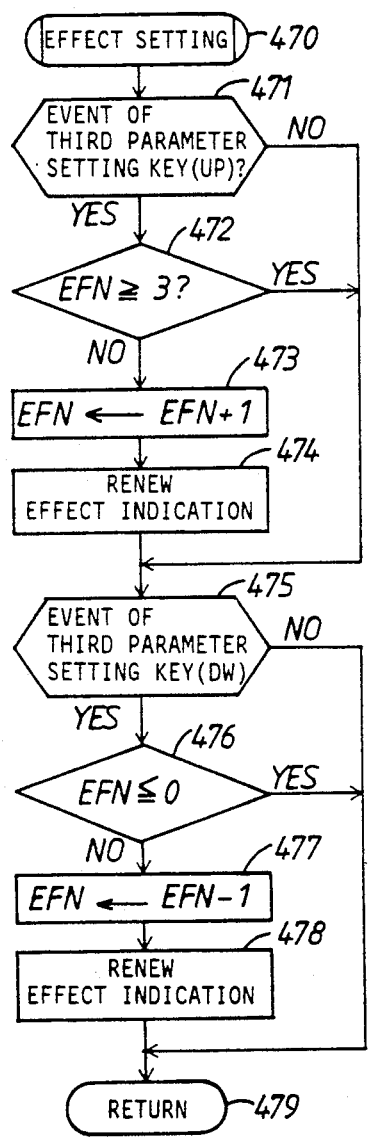

As shown in FIG. 15, the CPU 62 initiates execution of the effect setting routine at step 470. When the third parameter setting key 37a is operated, an effect number data EFN corresponding with respective effects memorized in the sound buffer of working memory 63 is increased by "1" up to a maximum value "3" in response to each operation of the setting key 37a during processing at step 471-473. When the third parameter setting key 37b is operated, the effect number data EFN is decreased by "1" in response to each operation of the setting key 37b during processing at step 475-477. When the effect number data EFN is renewed, a character * on the effect indication column in FIG. 21 is moved in accordance with the effect number data EFN under processing at step 474 or 478, and the execution of the effect setting routine is finished at step 479.

Figure 16:
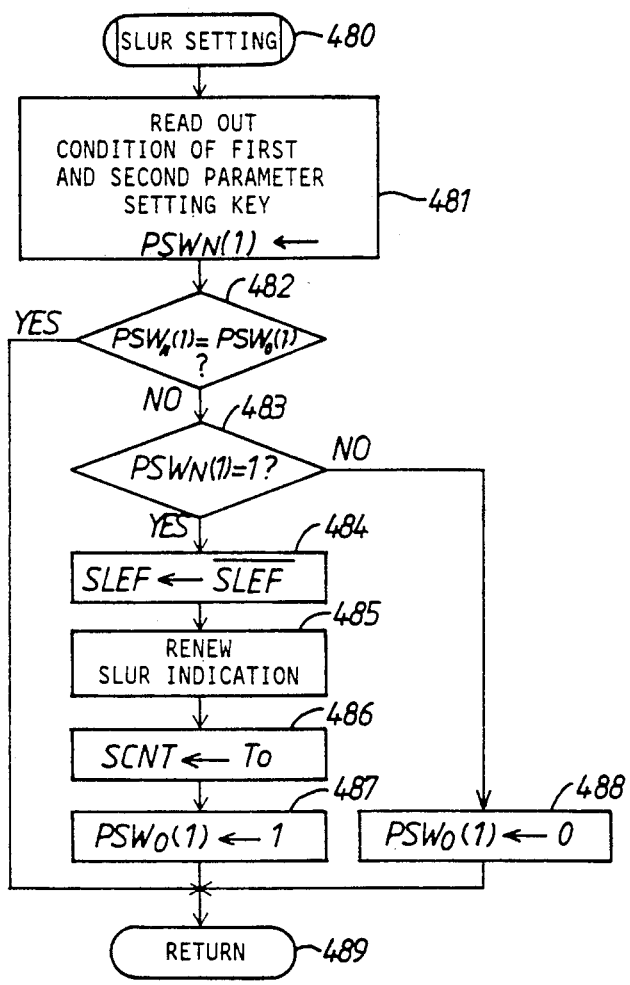

The CPU 62 further executes the slur setting routine at step 409 shown in FIG. 10. In this instance, the shift key 33a is operated to set the shift data SFT as "2", and the light emitting element 33a is lighted on display 31 as shown in FIG. 21. As shown in FIG. 16, the CPU 62 initiates execution of the slur setting routine at step 480 and reads out at step 481 a condition of the first and second parameter setting keys 34a, 34b and 35a, 35b from the operation switch circuit 20a to set it as a new parameter setting switch data $PSW_N(1)$. If in this condition either one of the parameter setting keys 34a, 34a; 35a, 35b is operated, the new parameter setting switch data $PSW_N(1)$ is set as "1". If the parameter setting keys 34a, 34a; 35a, 35b are turned off, the new parameter setting switch data $PSW_N(1)$ is set as "0". At the following step 482, the CPU 62 determines as to whether or not the new parameter setting switch data $PSW_N(1)$ is the same as the old parameter setting switch data $PSW_O(1)$. If the parameter setting keys are previously operated or turned off, the CPU 62 determines a "Yes" answer at step 482 and causes the program to proceed to step 489. If either one of the parameter setting keys 34a, 34b; 35a, 35b is turned on, the CPU 62 determines a "No" answer at step 482 and a "Yes" answer at step 483 to invert a slur effect data SLEF from "1" to "0" or from "0" to "1" at step 484 and to change the ON/OFF indication of the slur effect shown in FIG. 21 at step 485. In this instance, the slur effect is indicated as "ON" when the slur effect data SLEF is "1" and as "OFF" when the slur effect data SLEF is "0". In the case that the slur effect indication is long in a lateral direction as shown in FIG. 21, the slur effect data SLEF can be changed by operation of either one of the parameter setting keys 34a, 34b; 35a, 35b after the shift key 32a has been operated.

After processing at step 485, the shift count data SCNT is set as the predetermined value $T_O$ at step 486. This means that the shift mode time set by operation of the shift key 32a at step 325 in FIG. 6 is prolonged. Accordingly, a number of musical tone control parameters can be changed for the shift mode time after operation of the shift key 32a. Subsequently, the old parameter setting switch data $PSW_O(1)$ is renewed as "1" at step 487, and the program proceeds to step 489. If all the parameter setting keys 34a, 34b; 35a, 35b are turned off in a condition where either one of them has been turned on, the CPU 62 determines a "No" answer respectively at step 482 and 483, renews the old parameter setting switch data $PSW_O(1)$ as "0" at step 488 and finishes the execution of the slur setting routine at step 489.

Figure 17:
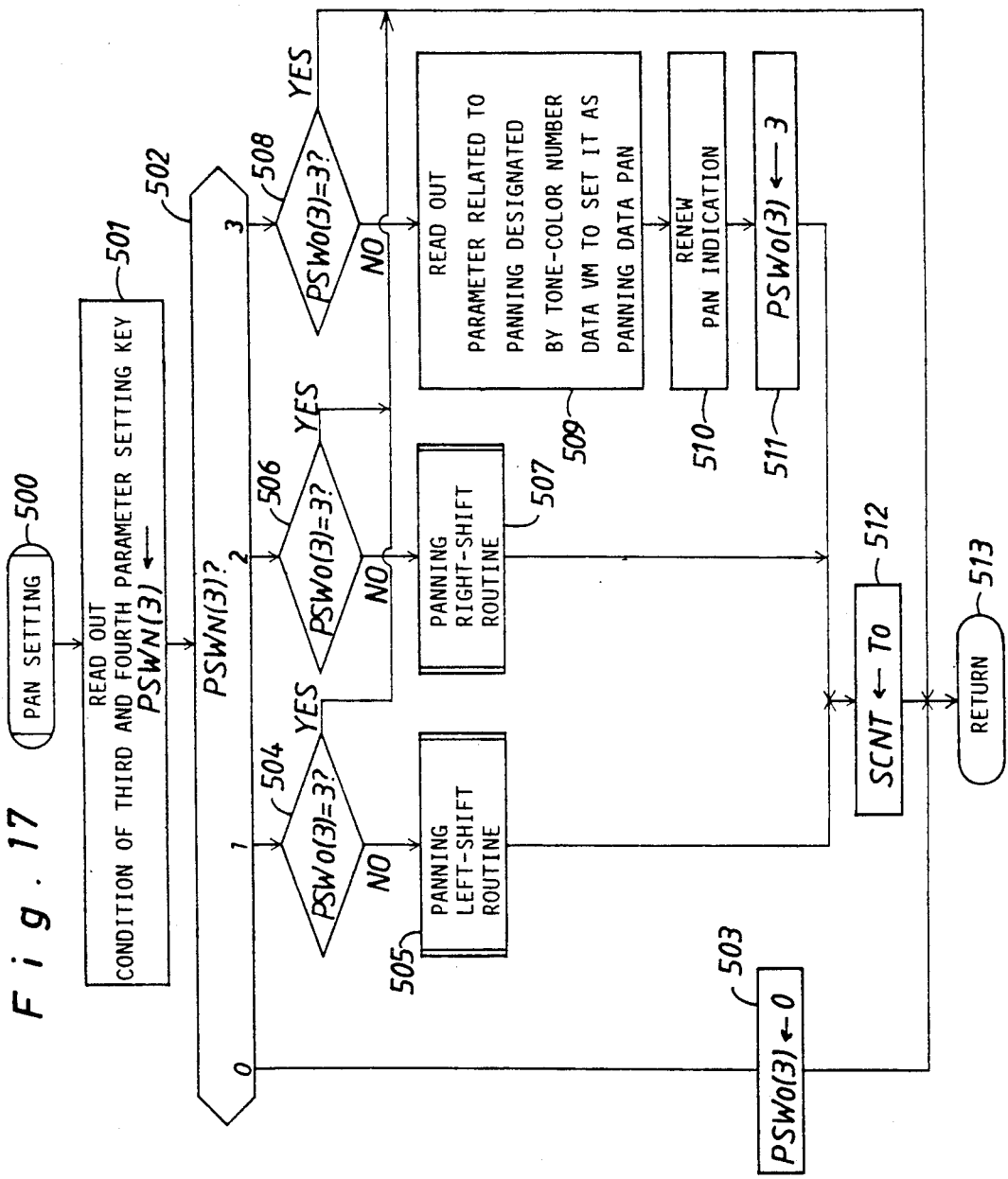
Figure 18:
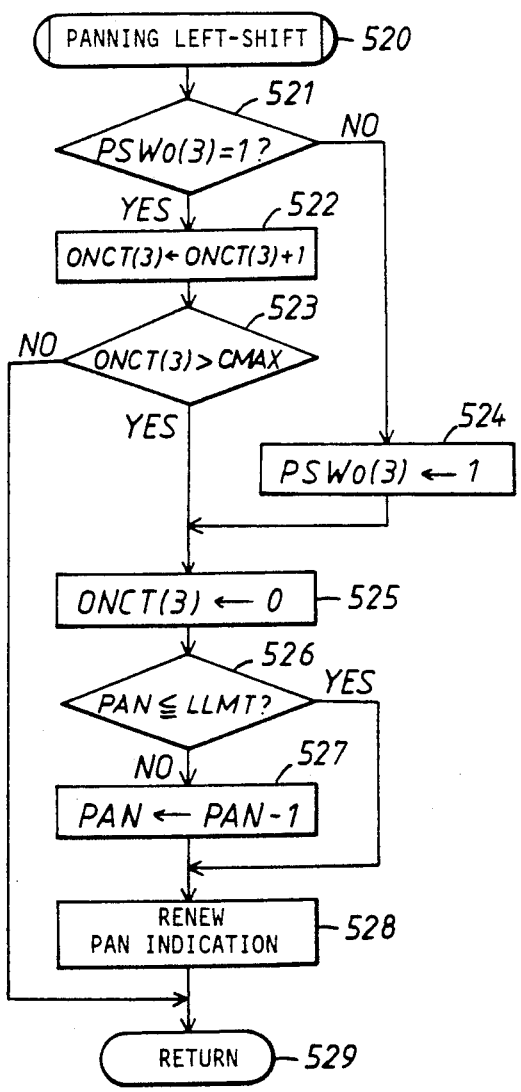
Figure 19:
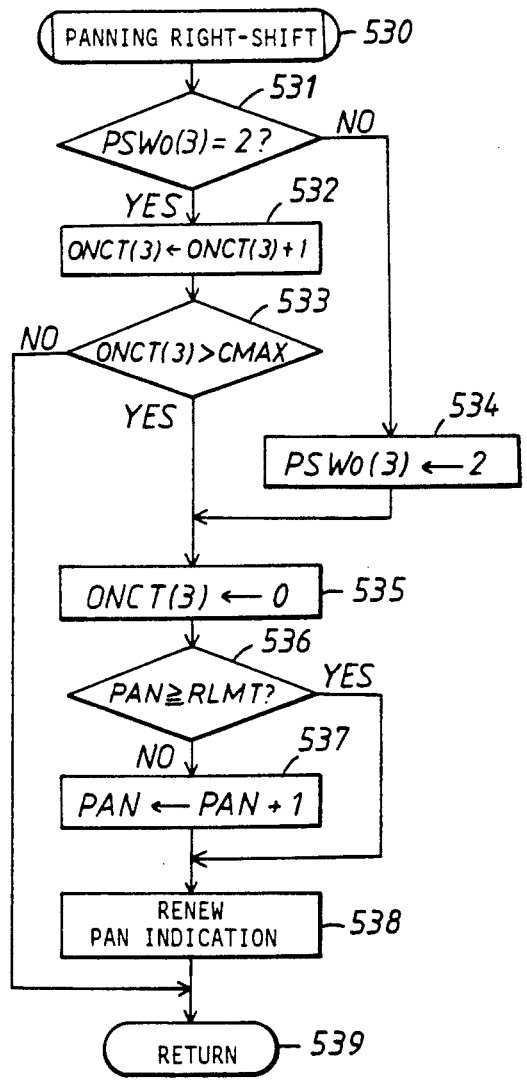

The CPU 62 further executes the panning setting routine at step 410 shown in FIG. 10. In this instance, the shift data SFT, the indication on display 31 and the lighted condition of the light emitting element 33a are the same as those under execution of the slur setting routine. As shown in FIG. 17, the CPU 62 initiates execution of the panning setting routine at step 500 and reads out at step 501 a condition of the third and fourth parameter setting keys 36a, 36b; 37a, 37b from the operation switch circuit 20a to set it as a new parameter setting switch data $PSW_N(3)$. The new parameter setting switch data $PSW_N(3)$ is composed of two bits in which 1/0 of the lower bit represents turning on of either one of the parameter setting keys 36a, 36b or turning off of both the parameter setting keys 36a, 36b while 1/0 of the higher bit represents turning on of either one of the parameter setting keys 37a, 37b or turning off of both the parameter setting keys 37a, 37b. In addition, a previous condition of the parameter setting keys 36a, 36b; 37a, 37b is represented by an old parameter setting switch data $PSW_O(3)$ as will be described later. As to the data format, the old parameter setting switch data $PSW_O(3)$ is the same as the new parameter setting switch data $PSW_N(3)$.

At the following step 502 of the panning setting routine, the CPU 62 determines as to whether the new parameter setting switch data $PSW_N(3)$ is "0", "1", "2"

or "3". If all the parameter setting keys 36a, 36b; 37a, 37b are turned off, the new parameter setting switch data $PSW_N(3)$ is determined as "0" at step 502. Thus, the program proceeds to step 503 where the old parameter setting switch data $PSW_O(3)$ is renewed as "0". If either one of the parameter setting keys 36a, 36b is turned on, the new parameter setting switch data $PSW_N(3)$ is determined as "1" at step 502, and the program proceeds to step 504 where the CPU 62 determines a "Yes" answer if the old parameter setting switch data $PSW_O(3)$ is "3" and causes the program to proceed to step 513. This means that a panning left-shift routine may not be processed even if the parameter setting keys 36a, 36b are operated in a condition where the shift keys 32, 32b have been turned on or if both the parameter setting keys 36a, 36b; 37a, 37b are simultaneously operated. If the old parameter setting switch data $PSW_O(3)$ is not "3", the CPU 62 determines a "No" answer at step 504 and causes the program to proceed to step 505 for execution of the panning left-shift routine shown in FIG. 18.

Assuming that either one of the third parameter setting keys 36a, 36b has been first turned on, the old parameter setting switch data $PSW_O(3)$ is not yet set as "1". Accordingly, the CPU 62 determines a "No" answer at step 521 and causes the program to proceed to step 524 where the old parameter setting switch data $PSW_O(3)$ is set as "1". Under processing at step 526, 527, a panning data PAN in the sound buffer of working memory 63 is decreased while it is maintained larger than a left limit value LLMT. If either one of the parameter setting keys 36a, 36b is continually turned on, the CPU 62 determines a "Yes" answer at step 521 and causes the program to proceed to step 522 for processing at step 523 and 525-527. Under processing at step 522, 523 and 525-527, an on=count data OCNT(3) is increased by "1" from "0" to a maximum value CMAX under each execution of the panning left-shift routine, and the panning data PAN is decreased by "1" to the left limit value LLMT at each time when the on-count data ONCT(3) is increased up to the maximum value CMAX.

When either one of the fourth parameter setting keys 37a, 37b has been turned on, the new parameter setting switch data $PSW_N(3)$ is determined as "2" at step 502 shown in FIG. 17. In this instance, the program proceeds to step 506 where the CPU 62 determines a "Yes" answer if the old parameter setting switch data $PSW_O(3)$ is "3" and causes the program to proceed to step 513. If the answer at step 506 is "No", the program proceeds to step 507 where the CPU 62 executes a panning right-shift routine shown in FIG. 19. When either one of the fourth parameter setting keys 37a, 37b has been first turned on, the old parameter setting switch data $PSW_O(3)$ is not yet set as "2". Accordingly, the CPU 62 determines a "No" answer at step 531 and causes the program to proceed to step 534 where the old parameter setting switch data $PSW_O(3)$ is set as "2". Under processing at the following step 536 and 537, the panning data PAN is increased while it is maintained less than a right limit value RLMT. If either one of the fourth parameter setting keys 37a, 37b is continually turned on, the old parameter setting switch data $PSW_O(3)$ is still set as "2". Thus, the CPU 62 determines a "Yes" answer at step 531 and causes the program to proceed to step 532 for processing at step 533 and 535-537. Under processing at step 532, 533 and 535-537, the on-count data ONCT(3) is increased by "1" from "0" to the maximum value CMAX under each execution of the panning right-shift routine, and the panning data PAN is increased by "1" up to the right limit value RLMT at each time when the on-count data ONCT is increased up to the maximum value CMAX. As a result, the panning data PAN in the sound buffer of working memory 63 is increased or decreased in accordance with operation of the third and fourth parameter setting keys 36a, 36b; 37a, 37b. When the panning data PAN has been increased or decreased, an indication of the panning data PAN on display 31 is changed at step 528 or 538 as shown in FIG. 21. In the case that the panning indication is long in a lateral direction as shown in FIG. 21, the panning data PAN can be changed by operation of the third and fourth parameter setting keys 36a, 36b; 37a, 37b after the shift key 32a has been operated.

If either one of the third parameter setting keys 36a, 36b and either one of the fourth parameter setting keys 37a, 37b are simultaneously turned on, the new parameter setting switch data $PSW_N(3)$ is determined as "3" at step 502 shown in FIG. 17. Accordingly, the program proceeds to step 508 where the CPU 62 determines a "Yes" answer if the old parameter setting switch data $PSW_O(3)$ is "3" and causes the program to proceed to step 513. If the answer at step 508 is "No", the program proceeds to step 509 where the CPU 62 reads out a parameter representing a panning designated by the tone-color number data VN in the musical tone control parameter region 72 and sets the parameter as a panning data PAN in the sound buffer of working memory 63. At the following step 510, the panning indication on display 31 is changed in accordance with the panning data PAN, and the old parameter setting switch data $PSW_O(3)$ is set as "3" at step 511. After processing at step 505, 507 or 511, the shift count data SCNT is set as the predetermined value $T_0$. Thus, a number of musical tone control parameters can be continually changed for the shift mode time after the shift key 32a has been operated, and the processing of the panning setting routine is finished at step 513.

Although in the foregoing embodiment only the parameters related to the slur effect and panning control havebeen indicated on display 31 longitudinally in a lateral direction, the parameters related to the volume, brilliance, effect, reverb or the like may be indicated on display 31 longitudinally in the lateral direction. In the case that the parameter indications are overlapped with the parameter setting keys 34a, 34b-37a, 37b, the parameters may be set and changed by the parameter setting keys as well as the slur effect and panning control. The light emitting elements 33a-33c may be replaced with indication means such as markers arranged on the left or right side of display 31 to designate the upper, middle and lower columns on the screen. Although in the embodiment only the first and second screens are switched over on display 31 to indicate the musical tone control parameters thereon, various kinds of screens may be further provided to indicate additional musical tone control parameters thereon. In such a case, the screen indications may be changed by operation of the parameter setting mode key 23 or a plurality of parameter setting mode keys may be provided to switch over the screen indications.

What is claimed is:

1. An apparatus for setting a musical tone control parameter, comprising:
   display means for selectively providing a plurality of screens thereon and for indicating a plurality of musical tone control parameters on each of the screens;

a plurality of parameter setting keys arranged adjacent said display means and positioned to correspond with each position of the musical tone control parameters indicated on the respective screens;

an operation key arranged to be operated for selecting one of the screens;

means for switching over the screen on said display means in response to operation of said operation key; and means for setting the musical tone control parameters in response to each operation of said parameter setting keys for controlling a musical tone to be generated.

2. An apparatus as claimed in claim 1, wherein said display means is arranged to indicate the plurality of musical tone control parameters respectively on a plurality of columns on each of the screens, and wherein a plurality of second display means are associated with said first-named display means to selectively designate one of the columns on the respective screens when activated so that the musical tone parameters on the designated column are set in response to each operation of said parameter setting keys, and a plurality of shift keys are arranged to be operated for selectively activating said second display means.

3. An apparatus for setting a musical tone control parameter, comprising:

first display means for indicating a plurality of musical tone control parameters respectively on a plurality of columns on a screen provided thereon;

a plurality of second display means associated with said first display means to selectively designate one of the columns when activated;

a plurality of parameter setting keys arranged adjacent said first display means and positioned to correspond with each position of the musical tone control parameters indicated on the screen;

a plurality of shift keys arranged to be operated for selectively activating said second display means; and means for setting the musical tone control parameters designated by one of said second display means in response to each operation of said parameter setting keys for controlling a musical tone to be generated.

4. An apparatus as claimed in claim 2, wherein said second display means are arranged adjacent said first-named display means and positioned to correspond with the columns on each of the screens, and wherein said shift keys are arranged adjacent said parameter setting keys.

* * * * *